United States Patent [19]
Berger

[11] Patent Number: 4,749,605
[45] Date of Patent: Jun. 7, 1988

[54] METHOD OF MAKING PATTERNED FLEXIBLE SHEET-LIKE ARTICLES AND ARTICLES MADE BY SUCH METHOD

[75] Inventor: Harry Berger, Englewood, N.J.

[73] Assignee: LCI Industries, Inc., New York, N.Y.

[21] Appl. No.: 904,052

[22] Filed: Sep. 4, 1986

Related U.S. Application Data

[62] Division of Ser. No. 814,993, Dec. 31, 1985, Pat. No. 4,650,623.

[51] Int. Cl.⁴ .............................................. B32B 3/30
[52] U.S. Cl. ................................. 428/156; 428/14; 428/195; 428/203
[58] Field of Search .................. 428/14, 55, 77, 79, 428/81, 156, 195, 203; 264/74, 77, 245, 293, DIG. 57, 139; 156/63, 247, 267

[56] References Cited

U.S. PATENT DOCUMENTS

| | | | |
|---|---|---|---|
| 286,043 | 10/1883 | Mayall | 428/48 |
| 2,721,817 | 10/1955 | Hastings, III et al. | 156/247 |
| 3,323,976 | 6/1967 | Salcer | 428/79 |
| 3,793,418 | 2/1974 | Mori | 264/245 |
| 4,603,074 | 7/1986 | Pate et al. | 428/287 |

FOREIGN PATENT DOCUMENTS

| | | | |
|---|---|---|---|
| 0127718 | 7/1984 | Japan | 264/245 |
| 771123 | 3/1957 | United Kingdom | 156/63 |
| 785595 | 10/1957 | United Kingdom | 156/63 |

Primary Examiner—John E. Kittle
Assistant Examiner—Beth A. Bozzelli
Attorney, Agent, or Firm—Fitzpatrick, Cella, Harper & Scinto

[57] ABSTRACT

A method of manufacturing finished articles of flexible plastic material includes formation of a sheet of plastic material with a first portion having a raised pattern on one surface thereof and at least partially curing the sheet. The first portion having the raised pattern is removed from the sheet and a second portion of plastic material having a raised pattern on one surface and of a color contrasting with that of the first portion is formed in that area of the sheet from which the first portion was removed. A plastic backing layer is formed on the sheet and the article thus formed is cured. The backing layer may be of a color contrasting with that of the second portion of plastic material, or the first portion may be allowed to remain and its back surface may be coated with a layer of plastic of a color contrasting with that of the first portion after which the backing layer is applied.

10 Claims, 3 Drawing Sheets

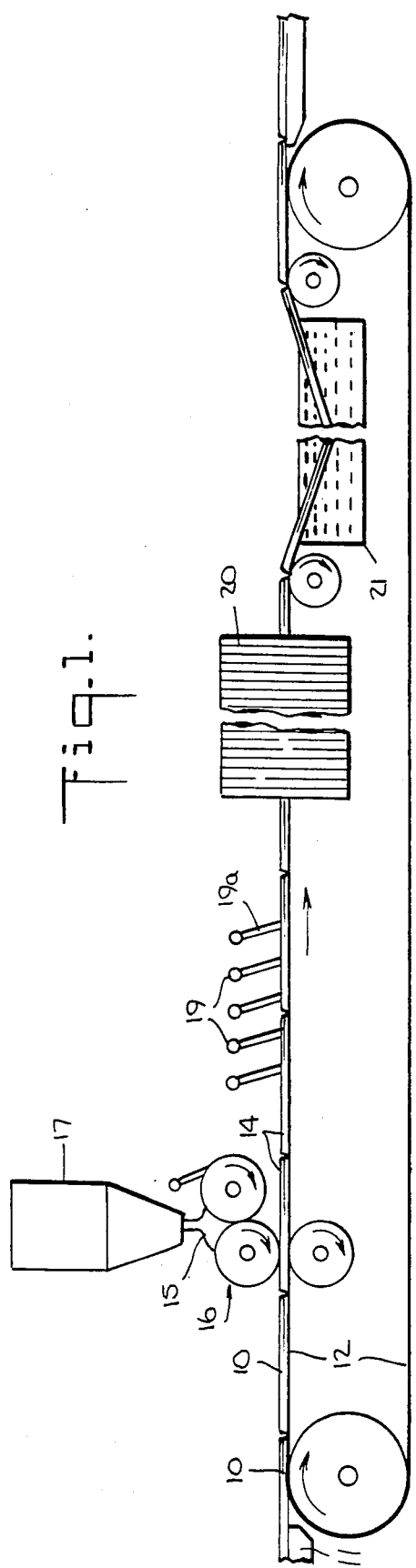
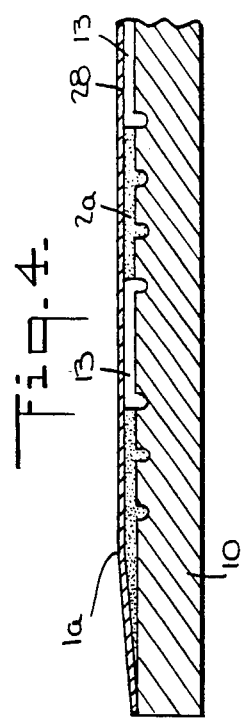
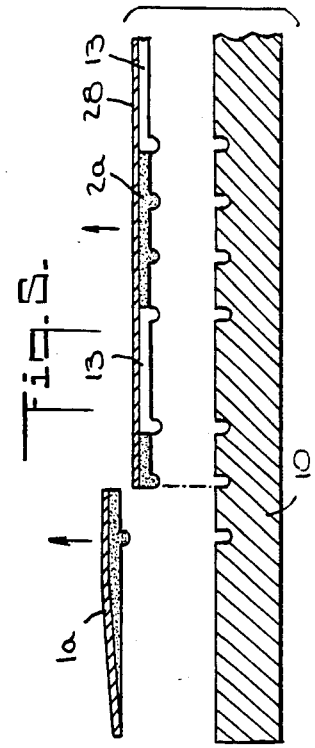
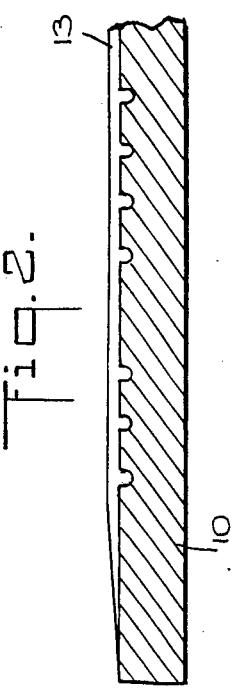
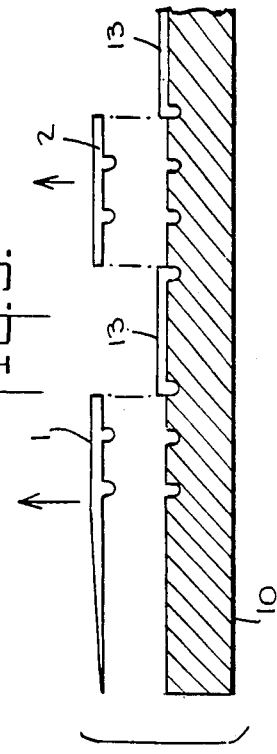

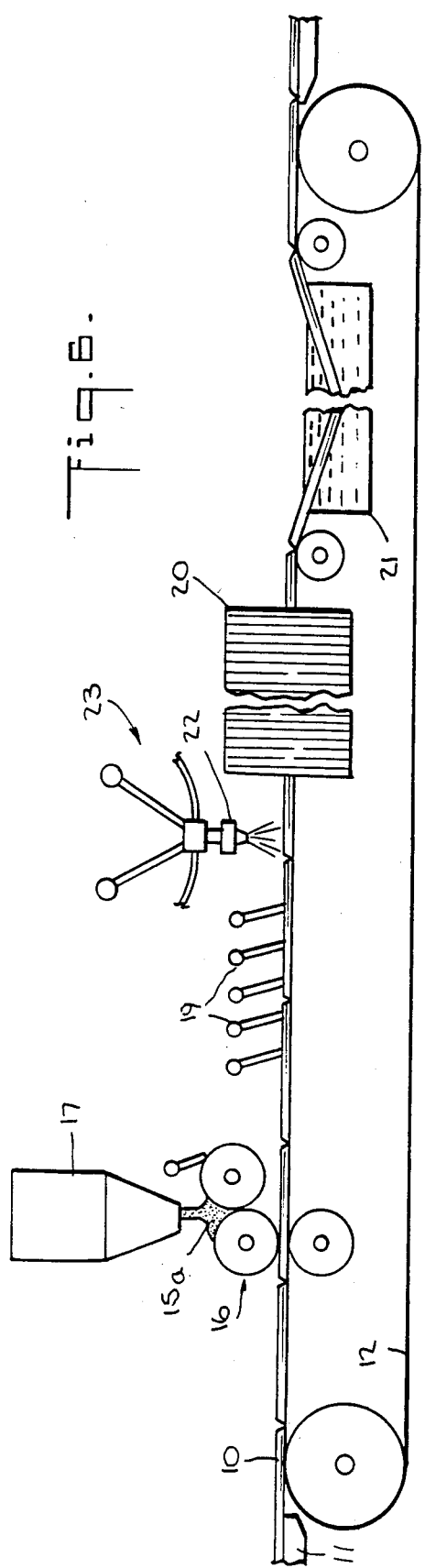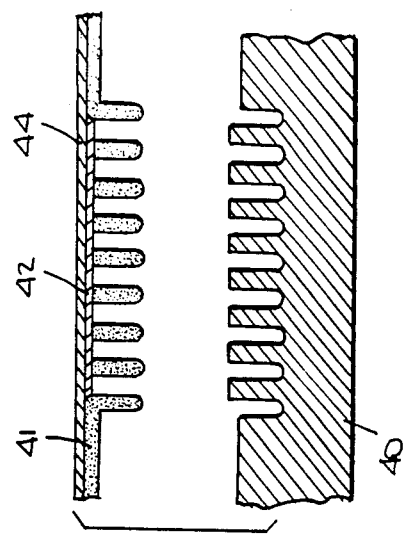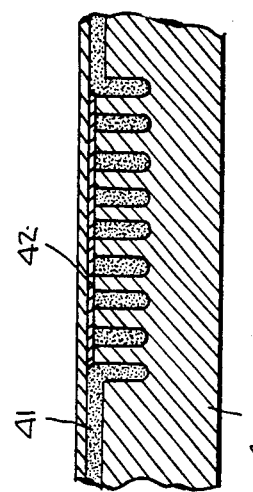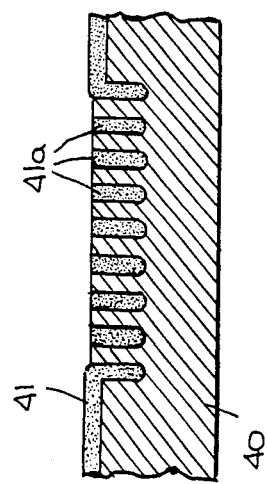

METHOD OF MAKING PATTERNED FLEXIBLE SHEET-LIKE ARTICLES AND ARTICLES MADE BY SUCH METHOD

This is a division of application Ser. No. 814,993, filed Dec. 31, 1985, issued as U.S. Pat. No. 4,650,623, on Mar. 17, 1987.

BACKGROUND OF THE INVENTION

1. Field of the Invention

This invention relates to a method of manufacturing flexible sheet-like articles having a raised bead pattern on one surface thereof. More particularly, it relates to a method of manufacture, from plastic materials, of articles such as tablecloths, place mats, doilies, shower curtains, drapes, aprons and the like comprising a perforated lace-like, three-dimensional plastic pattern bonded to a backing sheet of flexible plastic material or to a layer of plastic material or to both.

2. Description of the Prior Art

U.S. Pat. No. 3,150,216 discloses a method of manufacturing finished articles of flexible plastic material, as follows: forming a sheet of plastic material of substantially uniform thickness, forming at least one pair of closely spaced continuous beads of plastic material, the sheet and the beads being placed in overlying contact with each other while at least one of them is still less than fully cured, curing the still less than fully cured material while simultaneously bonding the sheet and the beads together to form a cured flexible plastic sheet having bonded to one surface thereof at least one pair of closely spaced continuous beads of flexible plastic material demarcating the desired finished article from unwanted scrap material comprising the rest of the sheet, and separating the scrap material from the finished article by tearing the sheet between the beads.

The foregoing method is useful in the production of articles of the class described especially where the desired pattern has irregular or indented edges and it is desired to conform the edges of the backing sheet or layer to the edges of the pattern.

SUMMARY OF THE INVENTION

I have conceived and contribute by the present invention a method of making patterned flexible sheet-like articles of plastic wherein a three-dimensional pattern such as a lace-like pattern, for example, is bonded to a backing sheet or layer which may be of contrasting color, the pattern being spaced inwardly of the edge of the sheet-like article to leave an unpatterned marginal area between the edge of the article and the pattern.

According to one aspect of the invention, I provide a method of manufacturing a finished article of flexible plastic material according to which I form a sheet of plastic material of substantially uniform thickness with a first portion having a raised pattern on one surface thereof. The sheet is then at least partially cured and the first portion having the raised pattern is removed from the sheet. I then form a second portion of plastic material having a raised pattern on one surface thereof of a color contrasting with the color of the first pattern and in that area of the sheet from which the first pattern was removed. A backing layer of plastic material of substantially uniform thickness is formed on the sheet and the article thus formed is cured.

The first and second portions of plastic material may be formed at an area of the sheet of plastic material spaced inwardly of the perimeter thereof to provide a rectangular pattern, for example inwardly of the edges of a tablecloth or the like, and the backing layer may be formed of a color contrasting with that of the second portion of plastic material.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

DESCRIPTION OF THE DRAWINGS

Specific embodiments of the invention have been chosen for purposes of illustration and description, and are shown in the accompanying drawings, forming a part of the specification wherein:

FIG. 1 is a diagrammatic representation of apparatus suited to the practice of the method of manufacture of the invention;

FIG. 2 is a partial cross-sectional view of a mold or die suited to the practice of the invention and showing edges of a die or mold pattern engraved thereon with a layer of plastic applied thereto;

FIG. 3 is a view similar to FIG. 2 but showing portions of the plastic removed from the mold;

FIG. 4 is a view similar to FIGS. 2 and 3 but showing the mold as in FIG. 2 with additional plastic including a backing layer applied thereto;

FIG. 5 is a view similar to FIG. 4 but showing removal of the formed article from the mold and the flash removed from the article;

FIG. 6 is a view similar to FIG. 1 and illustrating apparatus for applying a backing layer to the article;

FIGS. 9 and 10 are similar to FIGS. 2 and 4, respectively, but illustrate the practice of a second embodiment of the invention; and FIG. 11 is similar to FIG. 5 but relates to the second embodiment.

DESCRIPTION OF THE PREFERRED EMBODIMENTS

Figure 7:
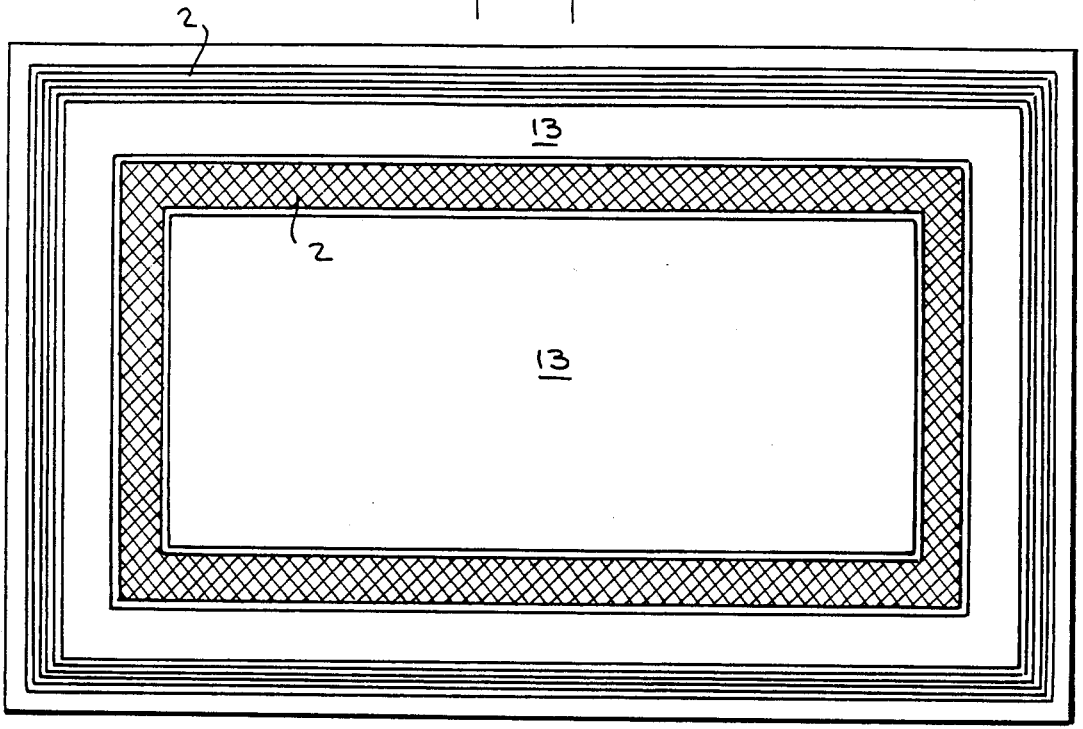
FIG. 7 is a top plan view of the molded sheet as it would appear if removed from the mold.

Referring now to the drawing, FIG. 1 illustrates a succession of plate type molds or dies 10 fed from a loading station 11 onto a moving endless conveyor 12, each of the molds being positioned on the conveyor 12 with its upper surface 14 bearing an engraved pattern.

As the molds 10 pass along on the conveyor 12 in the direction of the arrow, each successive mold is coated with a first or pattern layer of plastic material 15 by a reverse roll coater 16 to which the plastic is continuously supplied from a reservoir 17.

While my invention would be useful in the manufacture of articles from a variety of plastic materials, a vinyl dispersion plastisol is well suited as a raw material in the practice of the invention.

The first layer of plastic completely fills the die or mold pattern on the dies 10 with excess material deposited on the upper surface 14 of the molds 10.

The coated molds 10 are next moved progressively beneath a series of doctor blades 19, five being shown, which gradually wipe the excess plastic of the first layer from the upper surface 14 of each mold 10. As each mold leaves the downstream blade 19a, its upper surface 14 has been wiped clean of excess material leaving only a sheet or layer 13 of plastic material of substantially uniform thickness with a portion having a raised pattern on its lower surface, the pattern being formed by the filling of the engraved mold pattern.

Each mold 10 is next conveyed through a tunnel type oven 20 wherein the plastic material is at least partially cured in one of the molds 10. If vinyl plastisol is used, a curing time of 130 seconds at 390° F. has been found to be satisfactory under normal conditions.

As the molds bearing the partially finished articles emerge from the oven 20, they may be cooled by fans, water sprays or by a water immersion tank 21, as shown in FIG. 1.

After cooling, the dies 10 are removed from the conveyor 12, the molds are manually stripped of the flash 1 and the portion 2 of the plastic having the raised pattern thereon as shown in FIG. 3, these portions being readily separable from the remainder of the plastic sheet on the mold by being stripped by tearing between adjacent beads formed in the plastic sheet for that purpose.

The molds 10 bearing the plastic sheet 13 from which the flash 1 and portion 2 have been removed are again fed from loading station 11 to the conveyor 12 for further processing. Thus, as shown in FIG. 6, the molds are fed to the roll coater 16 for application from reservoir 17 of a layer of plastic material 15a of a color contrasting with the color of the sheet 13 and which fills the areas on the molds from which plastic had been stripped, as at 1a and 2a of FIG. 4, excess material again being removed by doctor blades 19.

The molds 10 then pass beneath apparatus 23 which applies a backing layer of plastic material to the upper surface of the material then on the molds (see 28 in FIG. 4).

Apparatus 23 may take the form of a transversely reciprocating spray nozzle 22 fed by flexible hoses with air and plastisol, respectively. Such a device applies a uniform second layer of plastic material to the entire surface facing the nozzle. Although other means could be used to apply the backing layer, it is essential only that the second layer be compatible with the plastic to which it is applied for complete bonding.

If desired, the backing layer may be of a color contrasting with that of the plastic applied to the engraved portion of the mold.

The molds are fed to the curing tunnel 20 and immersion tank 21 after which the newly formed flash is stripped and the formed article is washed.

Figure 8:
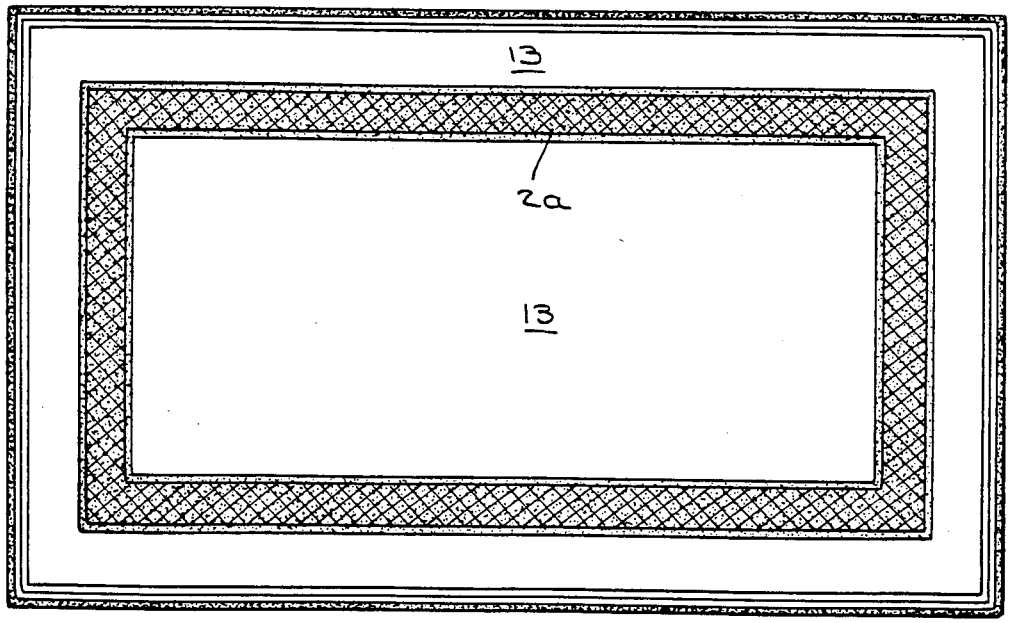
FIG. 8 is a top plan view illustrating the completed article manufactured according to the method of the present invention.

Referring briefly to FIG. 7, the partially completed article is shown with the flash, the patterned portion 2 and the sheet 13. FIG. 8 illustrates the finished article with the flash removed, the final patterned portion defining a lace-like pattern, for example, and with a backing sheet bonded to the underside of the article as viewed. It will be appreciated that the molds may be engraved to form a textured surface on the otherwise unpatterned sheet or layer 13, if desired, to present a linen-like effect, for example.

FIGS. 9 to 11 illustrate an embodiment of the invention according to which the patterned portion itself may be of several colors.

Thus, the mold 40 is formed so that the unpatterned portion is at a level slightly lower than the patterned portion. A layer of plastic 41 is applied to the mold surface and is wiped by the doctor blades to leave a thin, uniform layer on the mold surface including the patterned surface so that pattern itself is filled as at 41a. It will be appreciated that since portions of the pattern are not connected to the primary portion, these unconnected portions will not be stripped but will remain in the mold. For example, individual depressions in the mold of FIG. 9 may contain charges of plastic 41a that will not be stripped, but will remain in the mold along with layer 41. The plastic thus deposited is at least partially cured and cooled, and the primary portion of the design is stripped. However in this case, the patterned area of the mold is formed so that while the primary patterned design is continuous, that is, is defined by a continuous engraved mold pattern, secondary portions of the pattern may be unconnected to the primary portion. The mold bearing the plastic is again fed to the machine of FIG. 6.

During a second pass, a plastic of a color contrasting with that of the first applied plastic is applied only to the patterned portion of the mold to provide a pattern of a second color. A third color may be applied as a layer 42 of FIG. 10 only on the patterned portion, if desired, and to which it bonds. The backing layer 44 is applied by the apparatus 23 of FIG. 6 as already described and the combined structure is cured, cooled and stripped to provide the finished article of FIG. 11 shown removed from the mold. The resulting product may be a table cloth as shown in FIG. 8, for example, wherein the main unpatterned portion of the cloth itself is of a first color, the portions 41a may be seen as a series of small, closely spaced, raised elements such as dots, quartrefoils or the like, of the same color as the main unpatterned portion, the primary design may be a second color or clear and the backing layer may be clear, or of yet a third color especially if the primary design is clear.

It will be understood that, if it is intended that the patterned portion be of the same color as the unpatterned portion of the article, then the first formed patterned portion is not stripped and replaced, but in subsequent processing through the machine, the layers 42 and 44 are applied and bonded as shown, and that various color and clear plastic layers may be used depending on the visual impression desired.

I believe that the practice of my novel method will now be understood and that the several advantages of my invention will be fully appreciated by those persons skilled in the art.

I claim:

1. A finished article of flexible plastic material, comprising:

a backing layer having a substantially uniform thickness and defining a continuous area;

a primary layer bonded to said backing layer, said primary layer being of a first color and defining an area which is less than the area defined by said backing layer; and a patterned layer bonded to said backing layer and bonded to adjacent portions of said primary layer, said patterned layer being of a second color contrasting with the first color and defining an area, the area defined by the backing layer being substantially the same as that together defined by both said patterned layer and said primary layer, said patterned layer further being formed with a raised pattern on the surface thereof opposite said backing layer.

2. The finished article of claim 1, wherein said backing layer has edges that define the continuous area and wherein said patterned layer is formed inwardly of the backing layer edges.

3. The finished article of claim 1, wherein said backing layer is of a color contrasting with said first color.

4. The finished article of claim 1, wherein said primary layer is formed with a textured pattern embossed therein.

5. A finished article of flexible plastic material, comprising:
   a backing layer having a substantially uniform thickness and defining a continuous area;
   a primary layer, having at least one open area therein, bonded to said backing layer, said primary layer being of a first color and defining an area which is less than the area defined by said backing layer;
   a patterned layer of a second color; and
   a third color layer disposed between said backing layer and said patterned layer and bonded thereto, said third color layer occupying the open area in said primary layer and being bonded to adjacent portions of said primary layer, said third color layer being of a third color other than said second color and defining an area, wherein the area defined by the backing layer is substantially the same as that defined by both the third color layer and the primary layer and wherein the patterned layer defined is further formed with a raised pattern on the surface thereof opposite said backing layer.

6. The finished article of claim 5, wherein said backing layer has edges that define the continuous area and wherein said patterned layer is formed inwardly of the backing layer edges.

7. The finished article of claim 6, wherein said third color layer is formed inwardly of the backing layer edges.

8. The finished article of claim 5, wherein said backing layer is colorless.

9. The finished article of claim 5, wherein said backing layer is of a color other than said third predetermined color.

10. The finished article of claim 5, wherein said primary layer is formed with a textured pattern embossed therein.

* * * * *